J. G. MOOMY.
TIRE LINER.
APPLICATION FILED NOV. 5, 1915.

1,182,699.

Patented May 9, 1916.

Inventor
Joseph G. Moomy

By
Attorney

UNITED STATES PATENT OFFICE.

JOSEPH G. MOOMY, OF ERIE, PENNSYLVANIA.

TIRE-LINER.

1,182,699.    Specification of Letters Patent.    Patented May 9, 1916.

Application filed November 5, 1915. Serial No. 59,857.

*To all whom it may concern:*

Be it known that I, JOSEPH G. MOOMY, a citizen of the United States, residing at Erie, in the county of Erie and State of Pennsylvania, have invented new and useful Improvements in Tire-Liners, of which the following is a specification.

This invention relates to tire liners and consists in certain improvements in the construction thereof as will be hereinafter fully described and pointed out in the claims.

More particularly the invention relates to that class of tire liners which are secured to the inner tube. With such a liner it is important that it occupy as little space as possible and it is also desirable that it sustains to some extent the air pressure of the tube.

Figure 1:
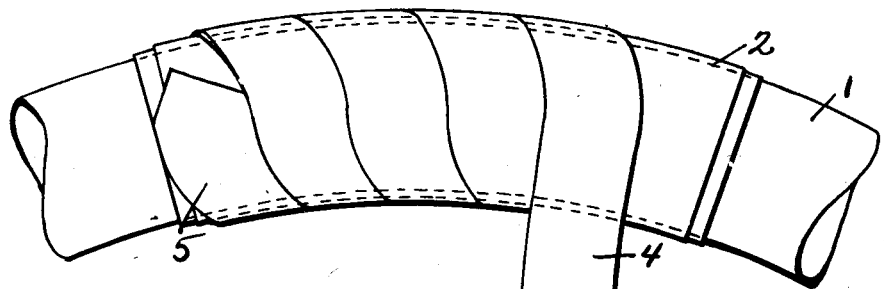
Figure 2:
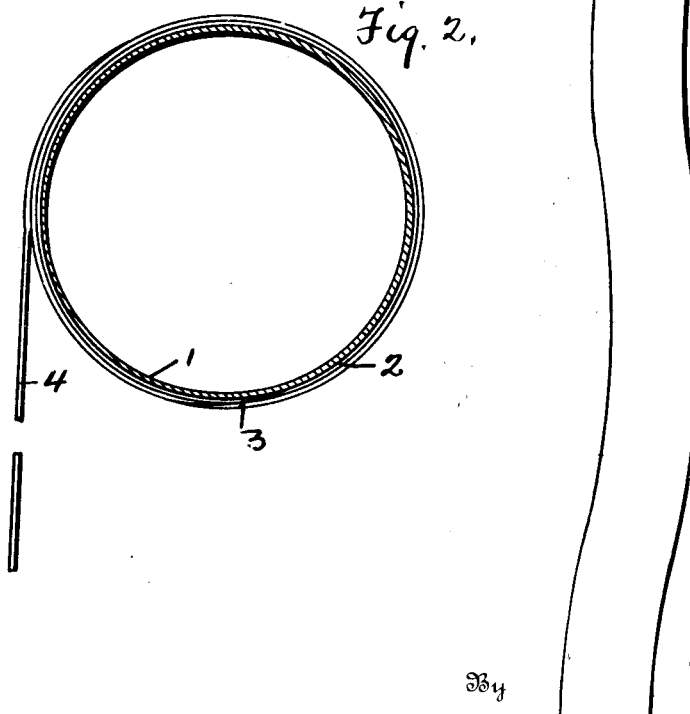

The invention is illustrated in the accompanying drawing as follows:

Figure 1 shows a fragment of the tube with the tire liner placed thereon. Fig. 2 shows an end view of the liner, the tube being in section.

1 marks the inner tube; 2 the case of the tire liner. This case is wrapped around the tube and is provided with a lap 3, preferably on the inner periphery of the tube. In forming this case it is preferably vulcanized on a mandrel having the curve and size of the tube so that the case will naturally take the form of the tube when put in place.

Winding strip 4 has its end 5 secured to the case 2, preferably as it is vulcanized. This winding strip 4 is wound spirally around the case so as to take as little room as possible in the tire yet give to the case and to the tube full support. In forming this winding strip, it is preferable to vulcanize it around the case while the case is in the curve of the tube so that when the winding strip is put in place on the case when in use it naturally takes the form and curve of the tube, thus taking but little space in the tire.

Both the case and the winding strip are formed of duck which has been treated with rubber and vulcanized.

What I claim as new is:—

1. In a tire liner the combination of a case adapted to surround a tube and a winding strip wound spirally on said case, said winding strip being formed of fabric and rubber and having an initial tendency to assume the shape in which it is when wound.

2. In a tire liner the combination of a case curved on its longitudinal axis and adapted to fit an inner tube and a winding strip wound spirally on said case, said winding strip being formed of fabric and rubber and having an initial tendency to assume the shape of the surface of the case when wound.

3. In a tire liner the combination of a case adapted to fit a tube and a winding strip fastened at one end to the case and wound spirally on said case, said winding strip being formed of a fabric and rubber and having a tendency to assume an initial shape following when wound the shape of the case.

In testimony whereof I have hereunto set my hand.

JOSEPH G. MOOMY.